United States Patent
Byun et al.

(10) Patent No.: US 10,129,776 B2
(45) Date of Patent: Nov. 13, 2018

(54) METHOD AND DEVICE FOR DISPLAYING ISOLATION OR RECOVERY OF BASE STATION IN WIRELESS COMMUNICATION SYSTEM

(71) Applicant: LG ELECTRONICS INC., Seoul (KR)

(72) Inventors: Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/318,912

(22) PCT Filed: Jul. 14, 2015

(86) PCT No.: PCT/KR2015/007288
§ 371 (c)(1),
(2) Date: Dec. 14, 2016

(87) PCT Pub. No.: WO2016/010337
PCT Pub. Date: Jan. 21, 2016

(65) Prior Publication Data
US 2017/0134973 A1    May 11, 2017

Related U.S. Application Data

(60) Provisional application No. 62/024,452, filed on Jul. 14, 2014.

(51) Int. Cl.
*H04W 24/04*    (2009.01)
*H04W 88/08*    (2009.01)
(Continued)

(52) U.S. Cl.
CPC ........... *H04W 24/04* (2013.01); *H04W 76/19* (2018.02); *H04W 88/08* (2013.01); *H04W 92/20* (2013.01); *H04W 36/08* (2013.01); *H04W 92/04* (2013.01)

(58) Field of Classification Search
None
See application file for complete search history.

(56) References Cited

U.S. PATENT DOCUMENTS 9,769,871 B2 *   9/2017  Giloh ................. H04W 84/005
2008/0051087 A1   2/2008  Ryu et al.
(Continued)

FOREIGN PATENT DOCUMENTS

KR   10-2005-0107667 A   11/2005
KR   10-2008-0018104 A    2/2008
(Continued)

OTHER PUBLICATIONS

Choi et al., "Automatic Air-Parameter Configuration of Moving BS", The Journal of KICS Conference (Autunm) 2010, Nov. 13, 2010, pp. 519-520. (http://www.kics.or.kr/storage/Event/Contents/20101108/101108_164452274.pdf), See section II.

*Primary Examiner* — Ayanah S George
(74) *Attorney, Agent, or Firm* — Birch, Stewart, Kolasch & Birch, LLP

(57) ABSTRACT

The present specification provides a method and device for displaying the isolation or recovery of a base station in a wireless communication system. The second base station receives information indicating the state of a link with a first base station and an evolved packet core (EPC) from the first base station or a mobility management entity (MME), and determines whether to perform a handover on the basis of the received information.

7 Claims, 14 Drawing Sheets

(51) Int. Cl.
*H04W 92/20* (2009.01)
*H04W 76/19* (2018.01)
*H04W 92/04* (2009.01)
*H04W 36/08* (2009.01)

(56) References Cited

U.S. PATENT DOCUMENTS

| | | | |
|---|---|---|---|
| 2010/0278143 | A1 | 11/2010 | Chun et al. |
| 2012/0157090 | A1* | 6/2012 | Kim ............... H04W 24/08 455/424 |
| 2013/0059585 | A1 | 3/2013 | Giloh |
| 2014/0024375 | A1* | 1/2014 | Fitzpatrick ........ H04W 36/0083 455/436 |
| 2015/0195706 | A1* | 7/2015 | Luft ............... H04W 8/30 370/216 |

FOREIGN PATENT DOCUMENTS

| | | |
|---|---|---|
| KR | 10-2013-0036178 A | 4/2013 |
| WO | WO 2013/111601 A1 | 8/2013 |

\* cited by examiner

METHOD AND DEVICE FOR DISPLAYING ISOLATION OR RECOVERY OF BASE STATION IN WIRELESS COMMUNICATION SYSTEM

CROSS REFERENCE TO RELATED APPLICATIONS

This application is the National Phase of PCT International Application No. PCT/KR2015/007288, filed on Jul. 14, 2015, which claims priority under 35 U.S.C. 119(e) to U.S. Provisional Application No. 62/024,452, filed on Jul. 14, 2014, all of which are hereby expressly incorporated by reference into the present application.

BACKGROUND OF THE INVENTION

Field of the Invention

The present invention relates to mobile communication, and more particularly, to a technique for identifying whether an adjacent base station is an isolated base station (isolated E-UTRAN).

Related Art

An isolated base station (isolated E-UTRAN) refers to an E-UTRAN that is not normally connected to an evolved packet core (EPC) or to a mobile base station (nomadic eNB (NeNB)) with an E-UTRAN function.

An isolated base station (isolated E-UTRAN) operation is used when a normal backhaul connection is restricted. The isolated E-UTRAN operation allows a base station to operate in an isolated manner without a backhaul connection in order to provide a communication function between those in charge of public safety even when a user moves out of the coverage of the E-UTRAN or a backhaul communication path is damaged. The isolated E-UTRAN operation is intended to adapt to failure and for a network to maintain a service acceptable level in an isolated base station. The isolated E-UTRAN operation is ultimately aimed at a service recovery.

An EPC refers to a core network structure in a 3GPP long term evolution (LTE) network. The EPC is an evolution of a GPRS core network and includes a mobility management entity (MME), a serving gateway (S-GW), a PDN gateway (P-GW), a home subscriber server (HSS), and the like.

In an X2 handover, a direct tunnel is created between a base station serving a user equipment (UE) and a target base station that the UE is newly to access during the handover and downlink traffic is transmitted to the UE through the tunnel. In an S1 handover, an indirect tunnel is created between a base station serving a UE and a target base station that the UE is newly to access via an S-GW during the handover and downlink traffic is transmitted to the UE through the tunnel.

SUMMARY OF THE INVENTION

The present invention provides a method and an apparatus for being indicated through an X2 interface between base stations (BSs) that an adjacent BS becomes an isolated BS (isolated E-UTRAN) or being indicated through an S1 interface with an MME that an adjacent BS becomes an isolated BS when a BS is disconnected from an EPC.

The present invention provides a method and an apparatus for being indicated through an X2 interface between BSs that an adjacent BS is not an isolated BS (isolated E-UTRAN) or being indicated through an S1 interface with an MME that an adjacent BS is not an isolated BS when a disconnection between a BS and an EPC is recovered.

According to one embodiment, there is provided a method for identifying, by a second BS, isolation or discovery of a first BS in a wireless communication system. The method may include: receiving information indicating a state of a connection between the first BS and an evolved packet core (EPC); and performing an operation based on the information indicating the state of the connection.

The information indicating the state of the connection may be information indicating that the connection between the first BS and the EPC is broken. Here, when there is a connection between the second BS and the EPC, the operation may be an operation of not performing a handover of a user equipment (UE) located in coverage of the second BS even though the UE moves to coverage of the first BS. When there is no connection between the second BS and the EPC, the operation may be an operation of determining whether it is possible to include the first BS in an isolated BS (isolated E-UTRAN) group.

The information indicating the state of the connection may be information indicating that the connection between the first BS and the EPC is recovered. Here, when there is a connection between the second BS and the EPC, the operation may be an operation of performing a handover of a UE located in coverage of the second BS when the UE moves to coverage of the first BS. When there is no connection between the second BS and the EPC, the operation may be an operation of excluding the first BS from an isolated BS (isolated E-UTRAN) group.

When there is an X2 connection between the first BS and the second BS, the information indicating the state of the connection may be received from the first BS, and the information indicating the state of the connection may be transmitted via an eNB isolation indication message, an eNB restoration indication message, or another message.

When there is no X2 connection between the first BS and the second BS, the information indicating the state of the connection may be received from a mobility management entity (MME), and the information indicating the state of the connection may be transmitted via an MME isolation indication message, an MME restoration indication message, or another message.

According to another embodiment, there is provided a BS for identifying isolation or recovery of a first BS in a wireless communication system. The BS may include: a memory; a transciever; and a processor to connect the memory and the transceiver, wherein the processor may control the transciever to receive information indicating a state of a connection between the first BS and an EPC, and may perform an operation based on the information indicating the state of the connection.

The information indicating the state of the connection may be information indicating that the connection between the first BS and the EPC is broken. When there is a connection between the second BS and the EPC, the operation may be an operation of not performing a handover of a UE located in coverage of the second BS even though the UE moves to coverage of the first BS.

When there is an X2 connection between the BS and the first BS, the information indicating the state of the connection may be received from the first BS; and when there is no X2 connection between the BS and the first BS, the information indicating the state of the connection may be received from a mobility management entity (MME).

It is possible to recognize in advance whether a neighboring BS is an isolated BS disconnected from an EPC, thereby preventing an unachievable handover from occurring or preventing an achievable handover from not occurring.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
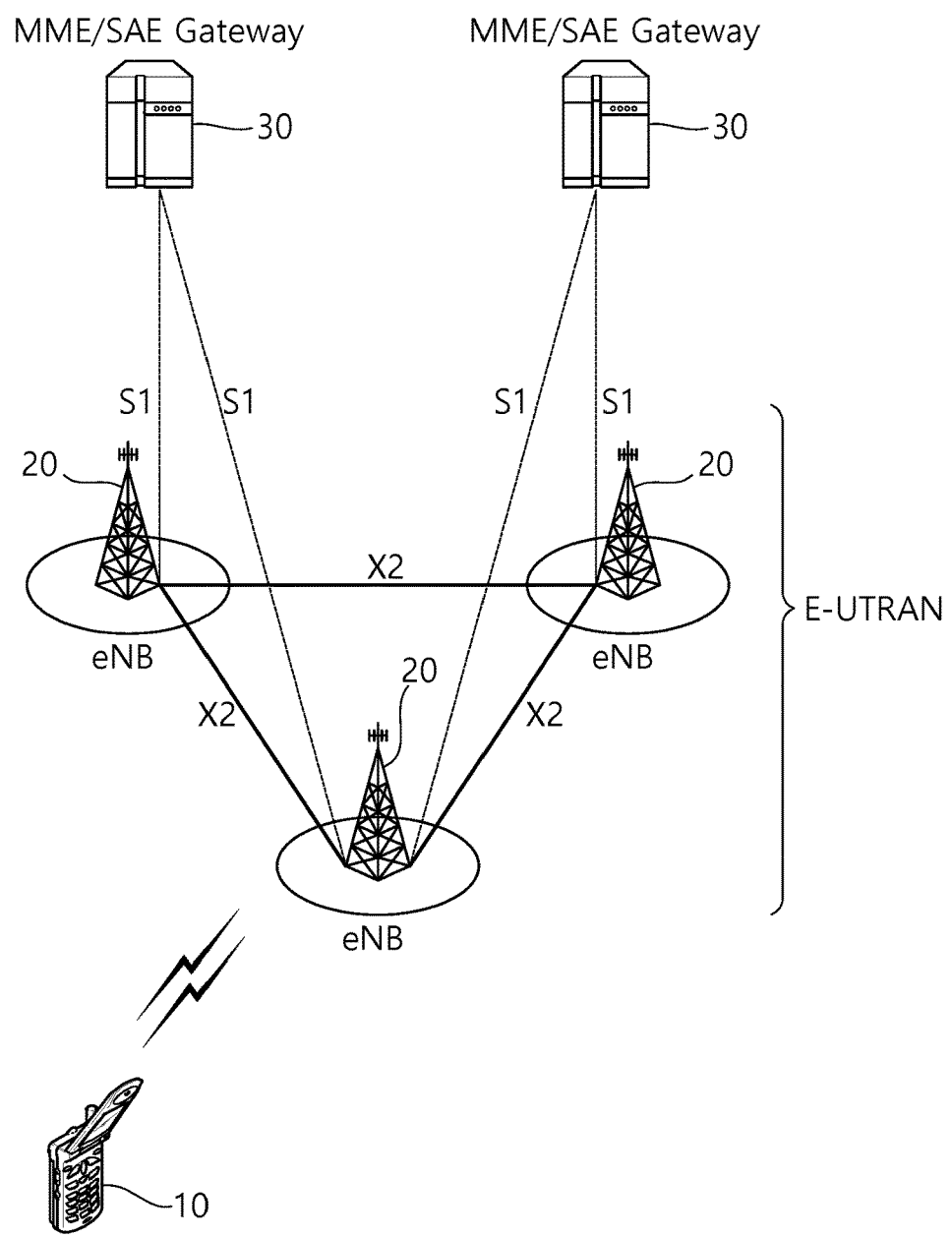
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

An EPC includes a mobility management entity (MME) and a system architecture evolution (SAE) gateway (S-GW). One or more MMEs/S-GWs 30 may be disposed at the end of a network and may be connected with an external network. For clarity, an MME/S-GW 30 may be simply referred to as a gateway hereinafter, in which it would be understood that the gateway includes both an MME and an S-GW.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface.

Figure 2:
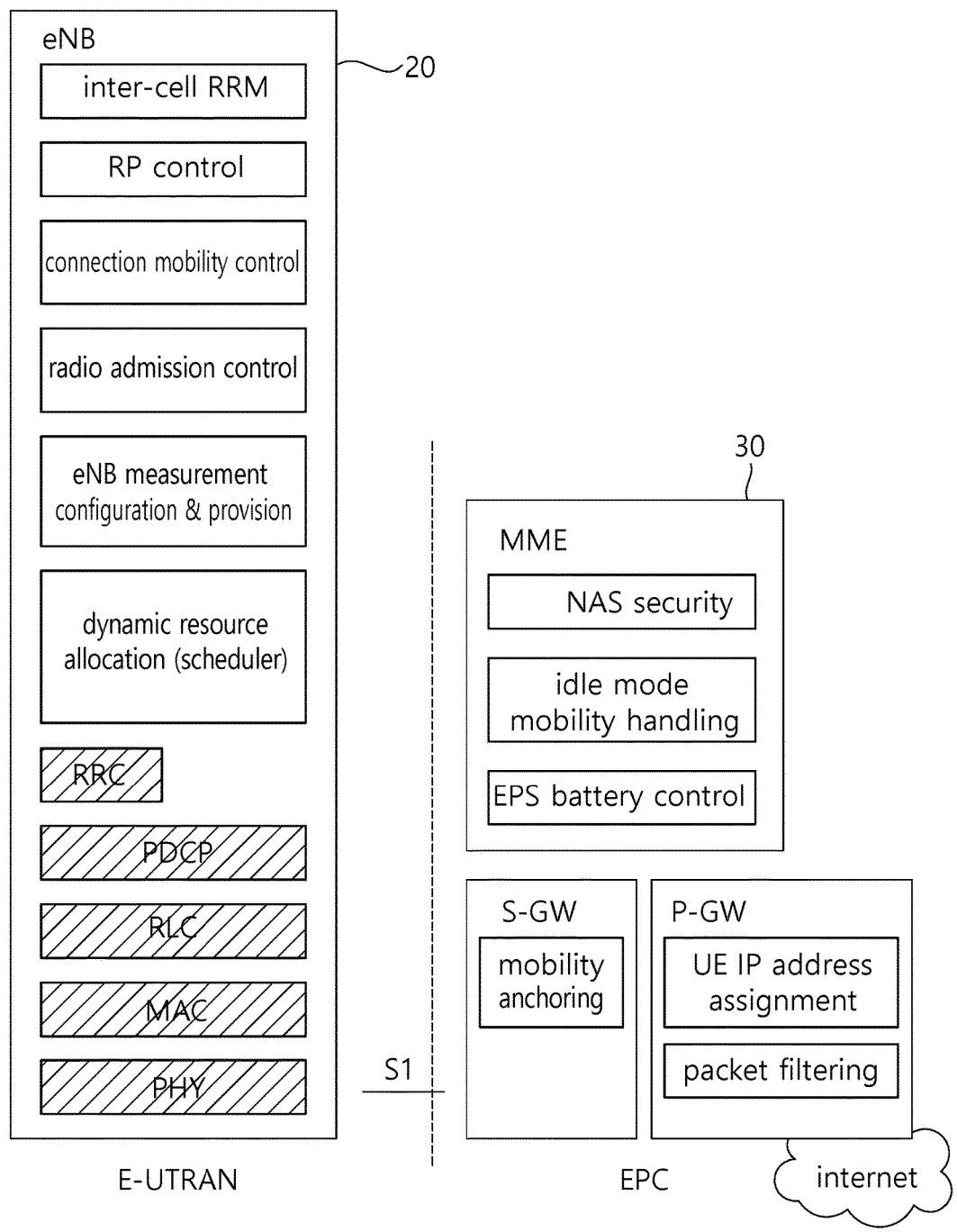
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
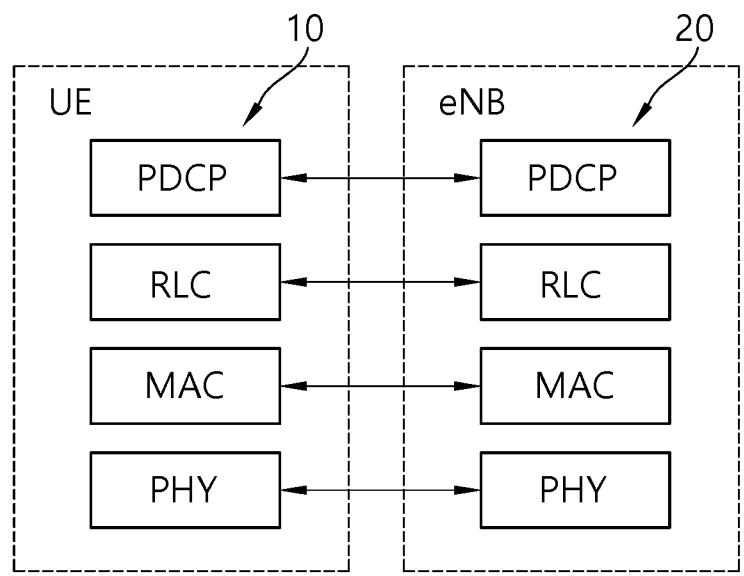
FIG. 3 shows a block diagram of a user plane protocol stack of an LTE system.
Figure 4:
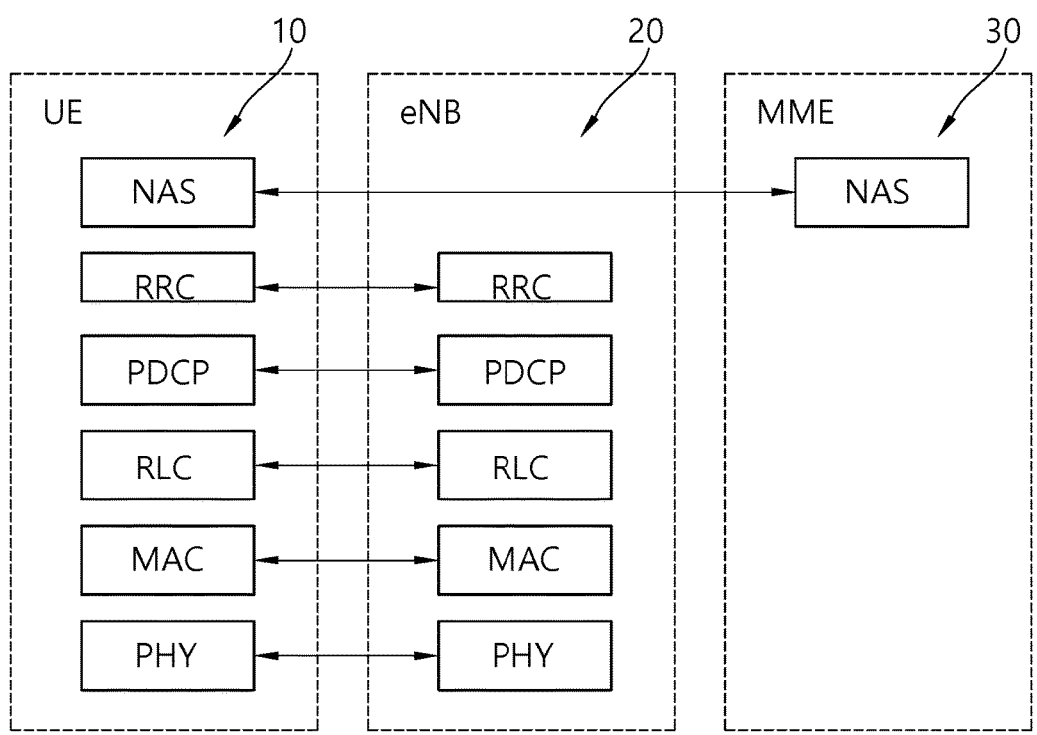
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 5:
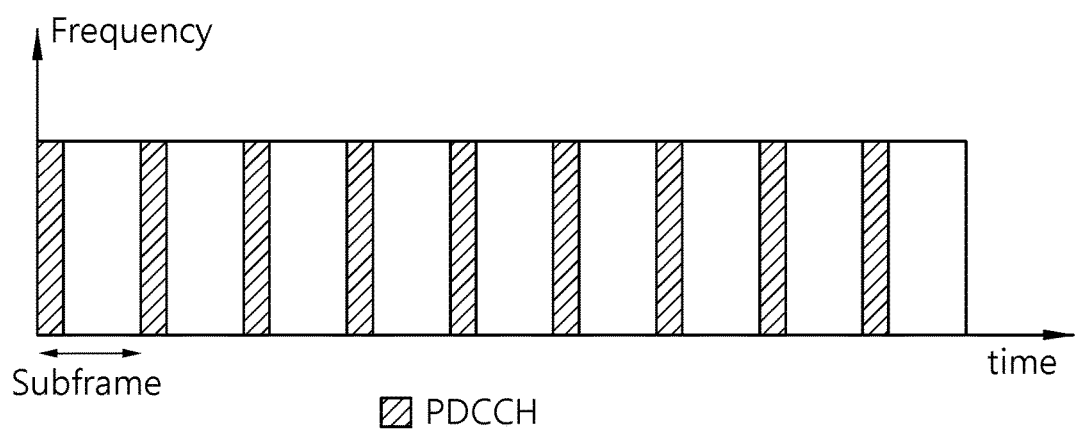
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

A method and a procedure of selecting a cell by a terminal in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

Figure 6:
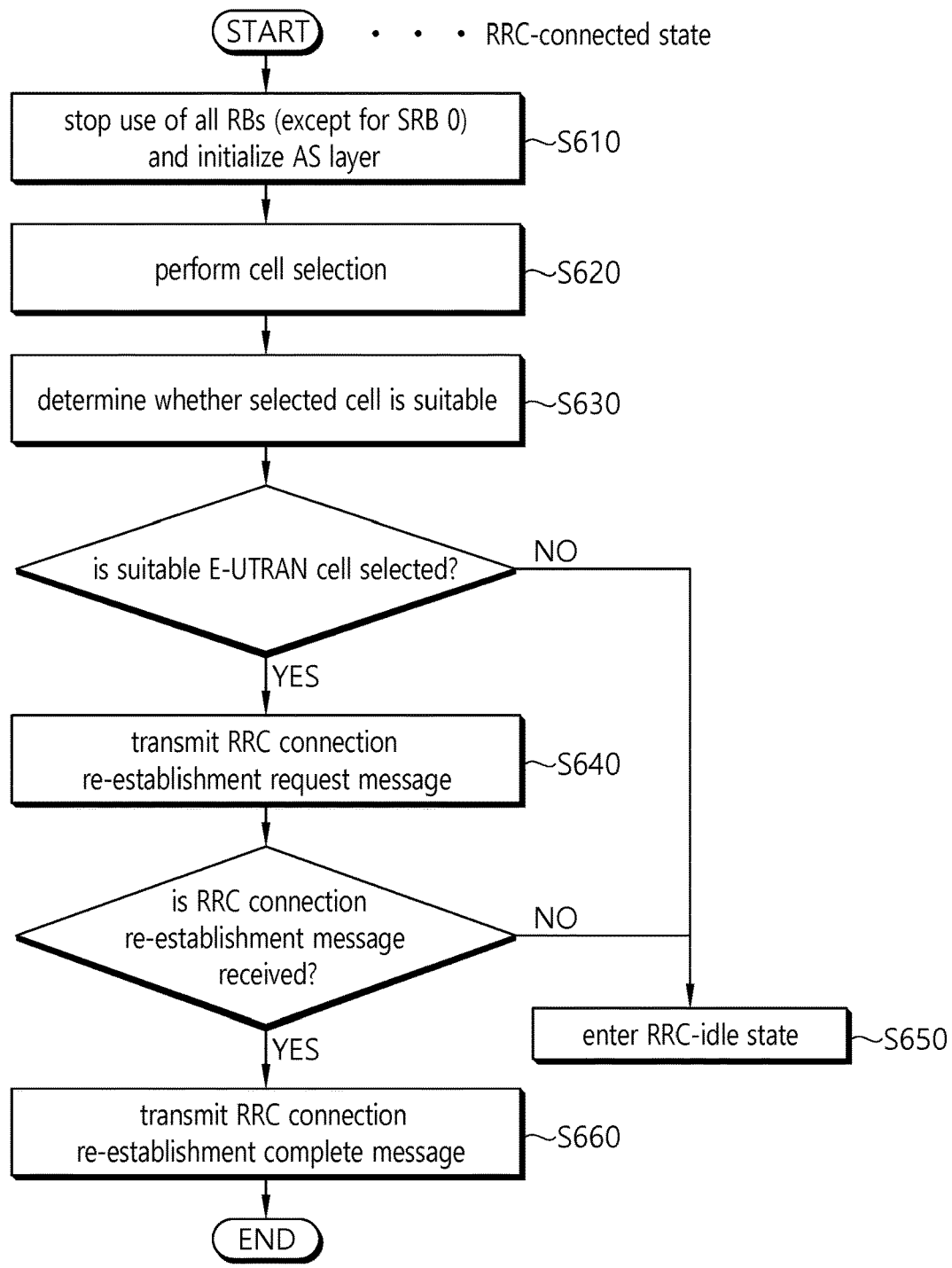
FIG. 6 shows a diagram illustrating a RRC connection re-establishment procedure.

FIG. 6 shows a diagram illustrating a RRC connection re-establishment procedure.

Referring to FIG. 6, the UE stops the used of all radio bearers which have been set except for signaling radio bearer #0 (SRB 0) and initializes each sub-layer of the AS (S610). Further, each sub-layer and the PHY layer are set as a default configuration. The UE maintains the RRC connection state during such a process. The UE performs a cell selection procedure for performing the RRC connection reconfiguration procedure (S620). The cell selection procedure in the RRC connection reconfiguration procedure may be performed the same as the cell selection procedure performed in the RRC idle state of the UE even though the UE maintains the RRC connection state. The UE verifies the system information of the corresponding cell to determine whether the corresponding cell is a suitable cell or not, after performing the cell selection procedure (S630). When it is determined that the selected cell is the suitable E-UTRAN cell, the UE transmits an RRC connection reestablishment request message to the corresponding cell (S640). Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S650).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE. The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB 1, and transmits to the cell an RRC connection reestablishment complete message that the RRC connection reestablishment procedure is completed (S660). On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Figure 7:
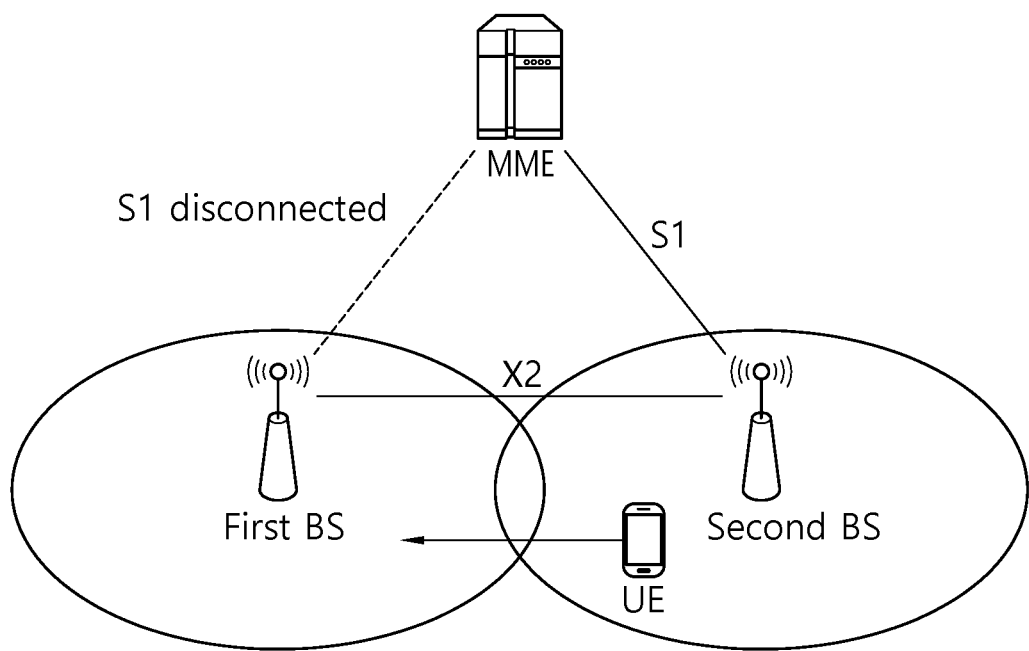
FIG. 7 illustrates a problem in a handover between an isolated BS disconnected from an EPC and a BS connected to the EPC.

FIG. 7 illustrates a problem in a handover between an isolated BS disconnected from an EPC and a BS connected to the EPC.

In FIG. 7, suppose that a first BS is an isolated BS disconnected from an EPC and there is an X2 connection between the first BS and a second BS. A UE in the coverage of the second BS moves to the first BS. When the UE reaches the edge of the cell of the second BS, the second BS does not know whether the first BS is an isolated BS and thus attempts to hand over the UE to the first BS. When this process happens, since there is no S1 connection from the first BS to an MME (that is, a path change request message using an S1 interface cannot be signaled from the first BS to the MME), the UE is not handed over to the first BS. Therefore, in this case, an unachievable handover may occur.

Figure 8:
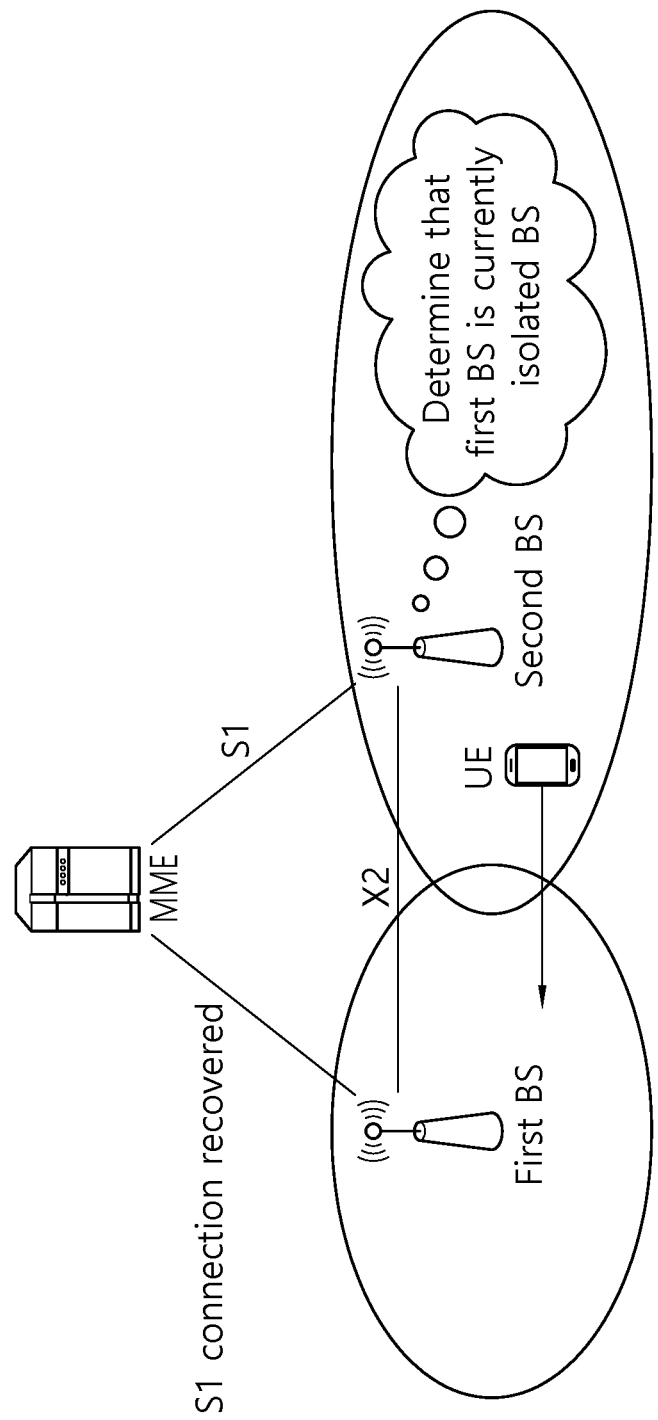
FIG. 8 illustrates a problem in a handover between a BS having a recovered connection to an EPC and a BS connected to the EPC.

FIG. 8 illustrates a problem in a handover between a BS having a recovered connection to an EPC and a BS connected to the EPC.

In FIG. 8, suppose that even though a connection between the first BS and the EPC returns to valid, a second BS recognizes the first BS as an isolated BS. Therefore, even though the UE reaches the edge of the cell of the second BS, the second BS mistakes the first BS as an isolated BS and thus does not perform a handover to the first BS. That is, an achievable handover may not occur. To solve the foregoing problems, the present invention suggests methods described below.

Figure 9:
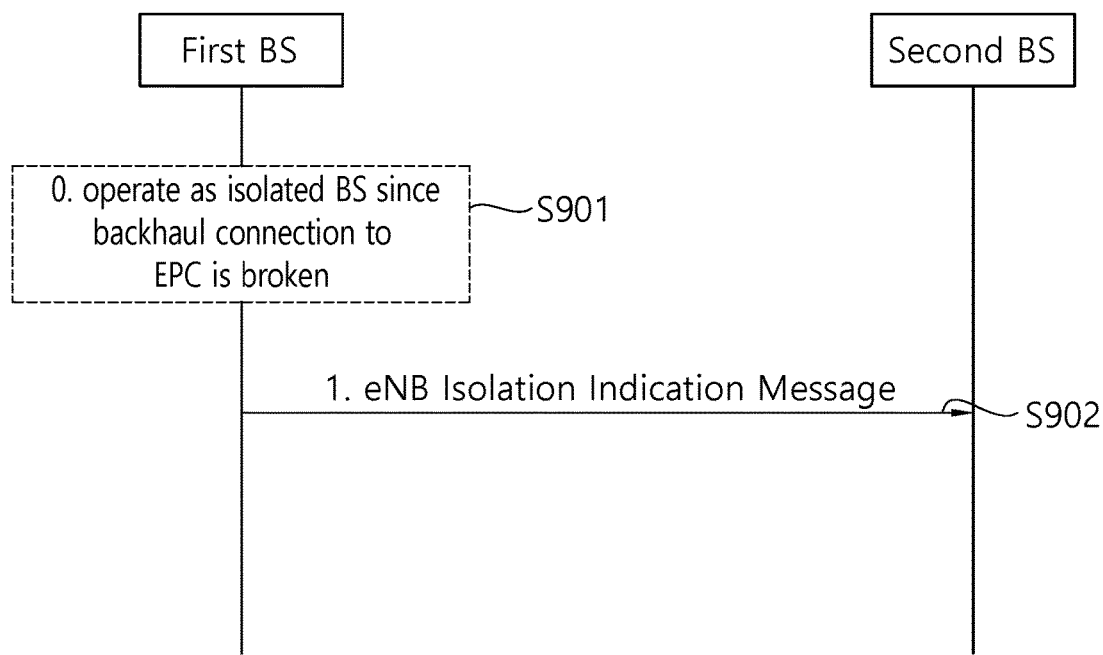
FIG. 9 illustrates a method of indicating that a first BS is an isolated BS using an X2 interface according to a suggestion of the present invention.

FIG. 9 illustrates a method of indicating that the first BS is an isolated BS using an X2 interface according to a suggestion of the present invention.

Suggested is a method of indicating to BSs connected to the first BS via X2 that the first BS is an isolated BS disconnected from the EPC. The suggested method is described in detail with reference to FIG. 9.

Since a backhaul connection of the first BS to the EPC is broken, the first BS becomes an isolated BS (S901). The first BS may indicate to the second BS that the first BS is an isolated BS using an isolation indication message (or an existing message or a new IE included in a new message/existing message) (S902). The isolation indication message transmitted from the BS is defined as an eNB isolation indication message hereinafter to be distinguished from an isolation indication message transmitted from the MME. When the eNB isolation indication message is received from the first BS, if the second BS is completely connected to an E-UTRAN, the second BS may not hand over a UE located in the coverage of the second BS to the first BS until the connection between the first BS and the EPC is recovered. When the eNB isolation indication message is received from the first BS, if the second BS is an isolated BS, it may be examined whether the first BS can be included in a group of several isolated BSs across a wide area according to an isolated BS use case.

Figure 10:
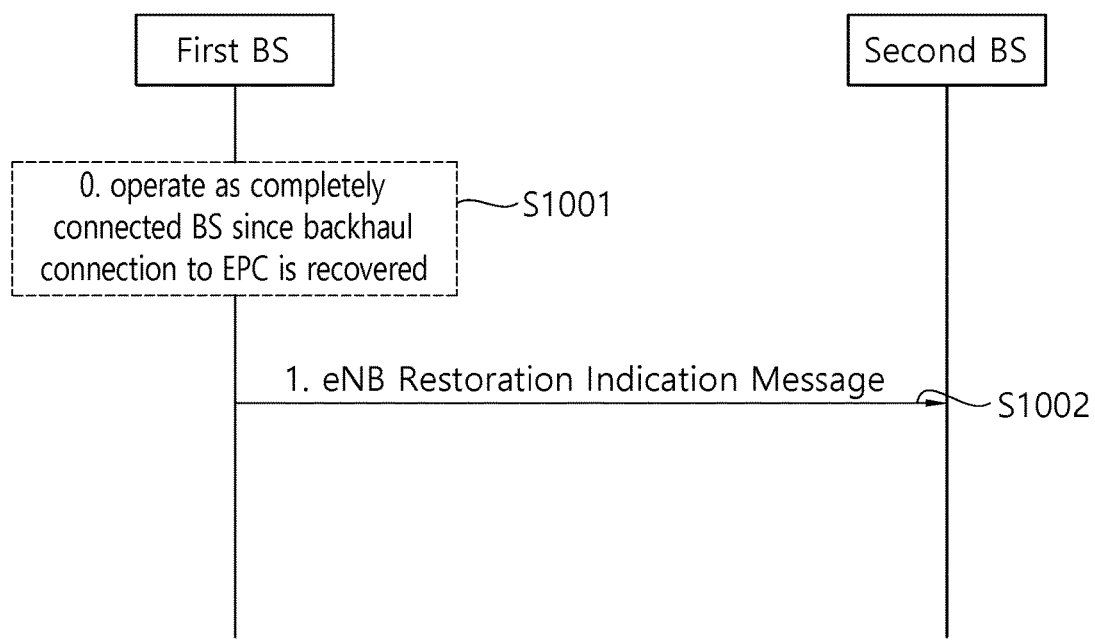
FIG. 10 illustrates a method of indicating that a connection between a first BS and an EPC is recovered using an X2 interface according to a suggestion of the present invention.

FIG. 10 illustrates a method of indicating that the connection between the first BS and the EPC is recovered using the X2 interface according to a suggestion of the present invention.

Suggested is a method of indicating to BSs connected to the first BS via X2 that the first BS has a recovered connection to the EPC. The suggested method is described in detail with reference to FIG. 10.

When the backhaul connection between the first BS and the EPC is recovered, the first BS is completely connected to the E-UTRAN to operate (S1001). That is, the first BS does not operate as an isolated BS any more. The first BS may indicate to the second BS that the first BS is completely connected to the E-UTRAN to operate using a restoration indication message (or an existing message or a new IE included in a new message/existing message) (S1002). The restoration indication message transmitted from the BS is defined as an eNB restoration indication message hereinafter to be distinguished from a restoration indication message transmitted from the MME. When the eNB restoration indication message is received from the first BS, if the second BS is completely connected to the E-UTRAN, the second BS may hand over a UE located in the coverage of the second BS to the first BS. When the eNB restoration indication message is received from the first BS, if the second BS is an isolated BS, the first BS may be excluded from a group of several isolated BSs across a wide area according to an isolated BS use case.

Figure 11:
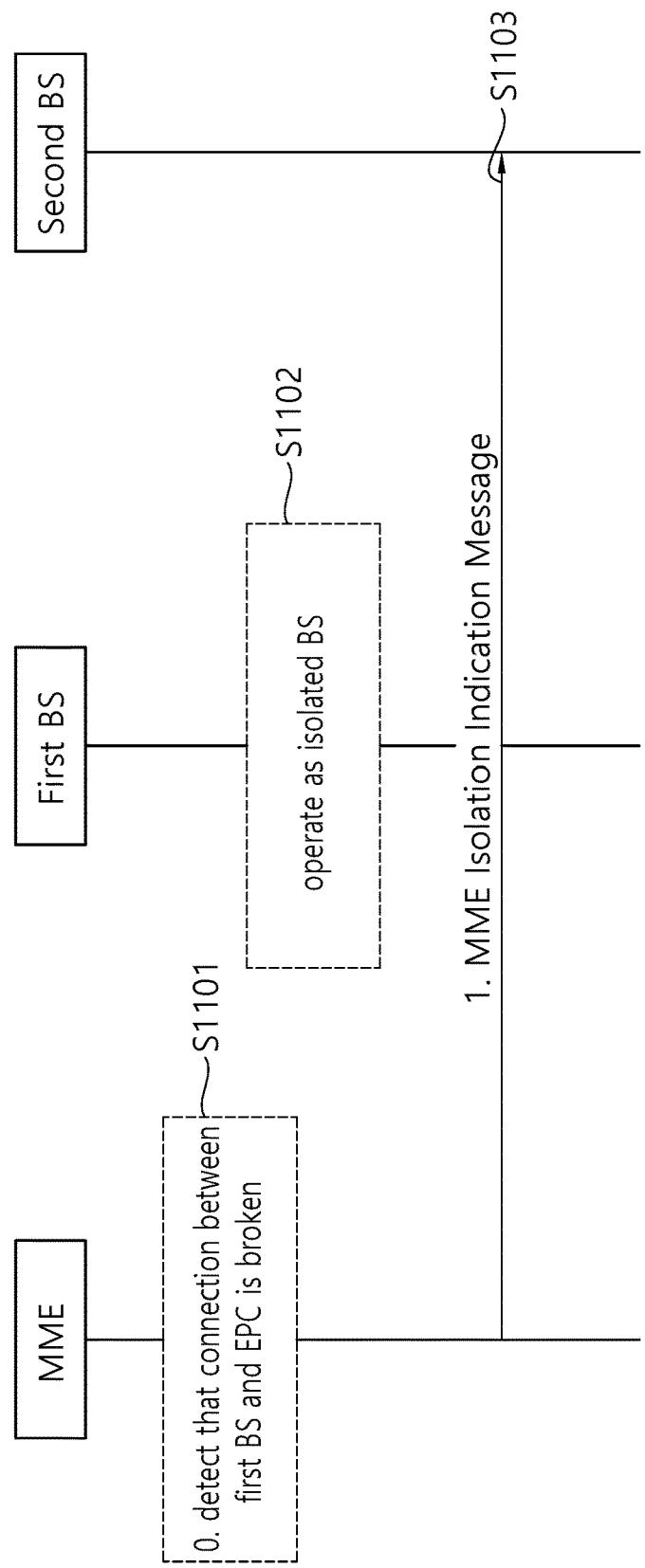
FIG. 11 illustrates a method of indicating that a first BS is an isolated BS using an S1 interface according to a suggestion of the present invention.

FIG. 11 illustrates a method of indicating that the first BS is an isolated BS using an S1 interface according to a suggestion of the present invention.

Suggested is a method of using the S1 interface between adjacent BSs and the MME in order to indicate to the adjacent BSs that the BS is isolated. This method may be used when there is no X2 connection between the BS and the adjacent BSs. The suggested method is described in detail with reference to FIG. 11.

The MME may detect that the connection between the first BS and the EPC is broken (S1101). In this case, the first BS operates as an isolated BS (S1102). The MME indicates to the second BS that the first BS is an isolated BS using an isolation indication message (or an existing message or a new IE included in a new message/existing message) (S1103). The isolation indication message transmitted from the MME is defined as an MME isolation indication message hereinafter to be distinguished from an isolation indication message transmitted from the BS. When the MME isolation indication message is received from the MME, if the second BS is completely connected to the E-UTRAN, the second BS does not hand over a UE located in the coverage of the second BS to the first BS until the connection between the first BS and the EPC is recovered. When the MME isolation indication message is received from the MME, if the second BS is an isolated BS, it may be examined whether the first BS can be included in a group of several isolated BSs across a wide area according to an isolated BS use case.

Figure 12:
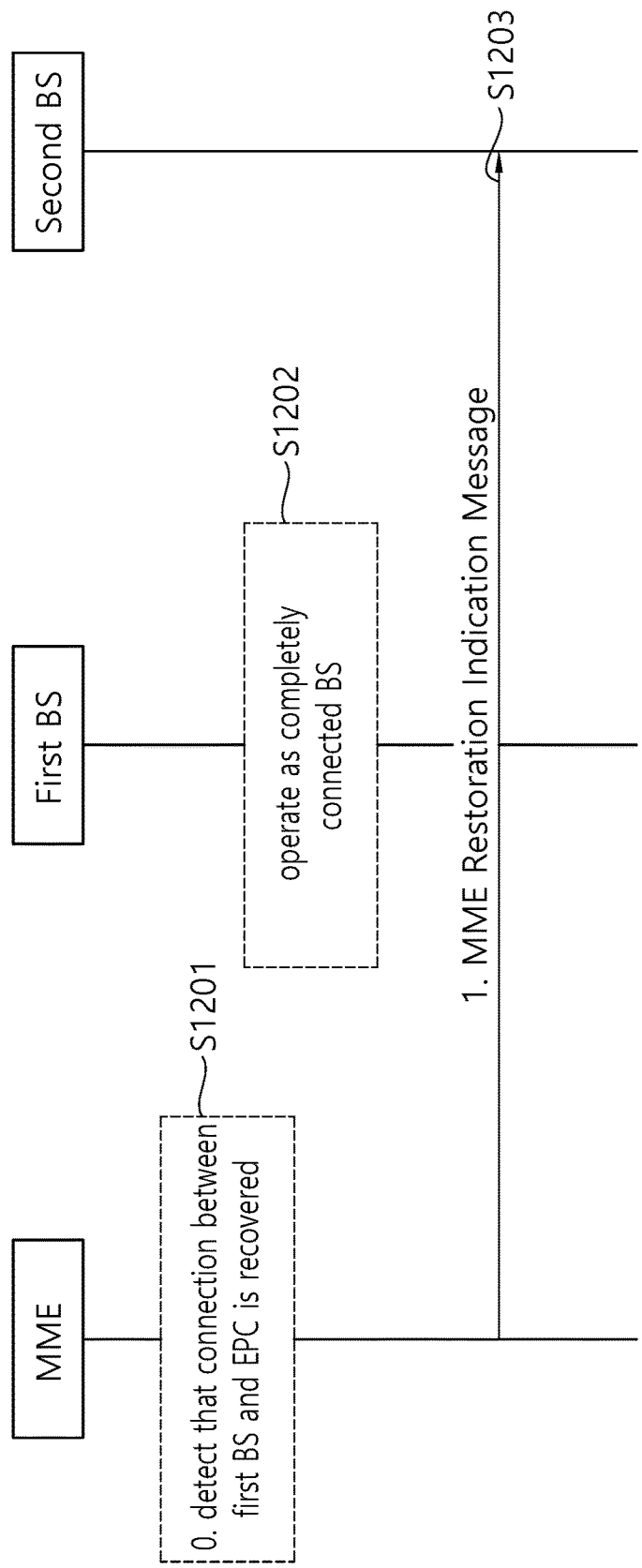
FIG. 12 illustrates a method of indicating that a connection between a first BS and an EPC is recovered using an S1 interface according to a suggestion of the present invention.

FIG. 12 illustrates a method of indicating that the connection between the first BS and the EPC is recovered using the S1 interface according to a suggestion of the present invention.

Suggested is a method of using the S1 interface between adjacent BSs and the MME in order to indicate to the adjacent BSs that the BS recovers. The suggested method is described in detail with reference to FIG. 12.

The MME may detect that the connection between the first BS and the EPC is recovered (S1201). In this case, the connection between the first BS and the EPC returns to valid, so that the first BS operates as a completely connected BS. That is the first BS does not operate as an isolated BS any more (S1202). The MME indicates to the second BS that the first BS recovers using a restoration indication message (or or an existing message or a new IE included in a new message/existing message) (S1203). The restoration indication message transmitted from the MME is defined as an MME restoration indication message hereinafter to be distinguished from a restoration indication message transmitted from the BS. When the MME restoration indication message is received from the MME, if the second BS is completely connected to the E-UTRAN, the second BS may hand over a UE located in the coverage of the second BS to the first BS. When the MME restoration indication message is received from the MME, if the second BS is an isolated BS, the first BS may be excluded from a group of several isolated BSs across a wide area according to an isolated BS use case.

According to the present invention illustrated in the embodiments of FIG. 9 to FIG. 12, when a BS hands over a UE to a neighboring BS due to the movement of the UE, the BS knows in advance whether the neighboring BS is an isolated BS disconnected from an EPC, thereby preventing an unachievable handover from occurring or preventing an achievable handover from not occurring.

Figure 13:
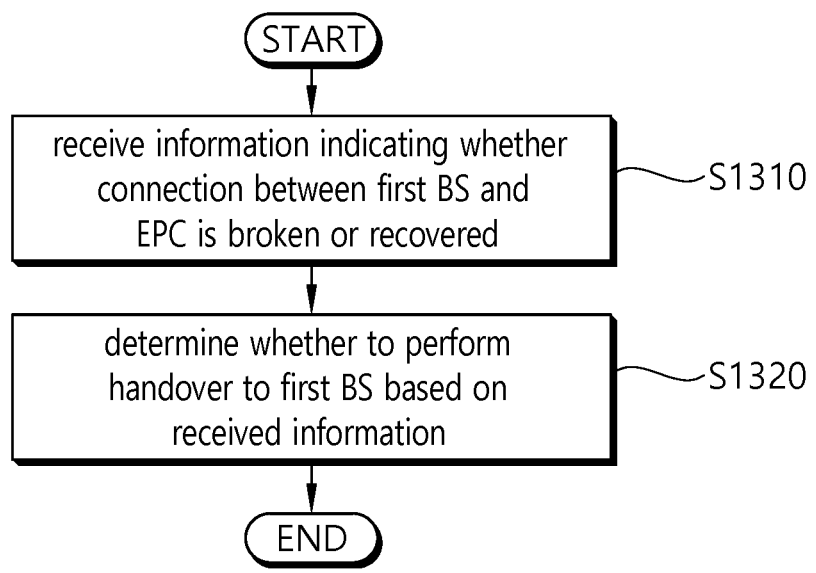
FIG. 13 is a block diagram illustrating a method in which a second BS identifies that a first BS is an isolated BS and performs an operation accordingly according to one exemplary embodiment of the present invention.

FIG. 13 is a block diagram illustrating a method in which a second BS identifies that a first BS is an isolated BS and performs an operation accordingly according to one exemplary embodiment of the present invention.

Referring to FIG. 13, the second BS receives information indicating whether a connection between the first BS and an EPC is broken or recovered (S1310). The information is received from the first BS when the first BS and the second BS are connected via X2, and is received from an MME when the first BS and the second BS are not connected via X2. The second BS determines whether to perform a handover to the first BS based on the received information (S1320). When the second BS receives information indicating that the connection between the first BS and the EPC is broken, the second may not perform a handover of a UE moving to the coverage of the first BS. When the second BS receives information indicating that the connection between the first BS and the EPC is recovered, the second may perform a handover of the UE moving to the coverage of the first BS. The present invention may prevent an unachievable handover from occurring or may prevent an achievable handover from not occurring.

Figure 14:
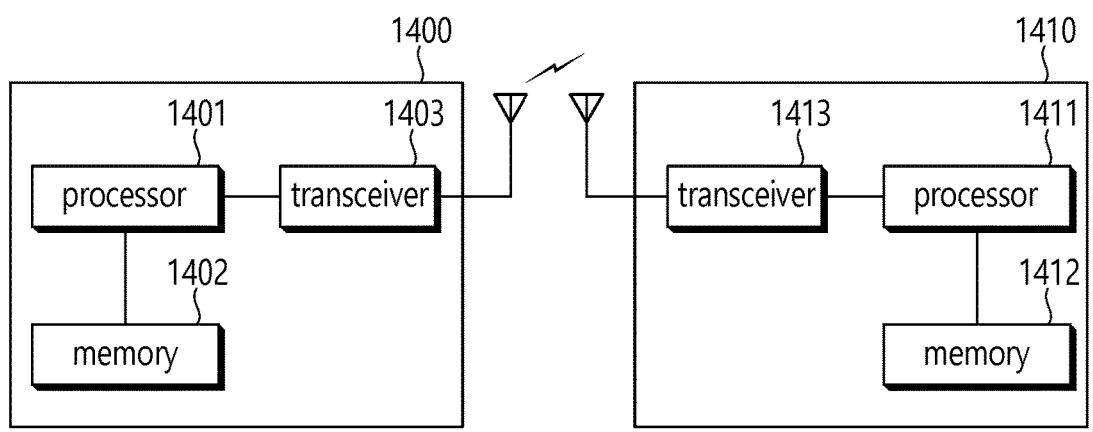
FIG. 14 is a block diagram illustrating a wireless communication system according to one embodiment of the present invention.

FIG. 14 is a block diagram illustrating a wireless communication system according to the embodiment of the present invention.

A BS 1400 includes a processor 1401, a memory 1402 and a transceiver 1403. The memory 1402 is connected to the processor 1401, and stores various information for driving the processor 1401. The transceiver 1403 is connected to the processor 1401, and transmits and/or receives radio signals. The processor 1401 implements proposed functions, processes and/or methods. In the above embodiment, an operation of the base station may be implemented by the processor 1401.

A UE 1410 includes a processor 1411, a memory 1412 and a transceiver 1413. The memory 1412 is connected to the processor 1411, and stores various information for driving the processor 1411. The transceiver 1413 is connected to the processor 1411, and transmits and/or receives radio signals. The processor 1411 implements proposed functions, processes and/or methods. In the above embodiment, an operation of the base station may be implemented by the processor 1411.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for identifying, by a second base station (BS), isolation or recovery of a first BS in a wireless communication system, the method comprising:
receiving, from a mobility management entity (MME), information on a broken connection between the first BS and an evolved packet core (EPC) or information on a recovered connection between the first BS and the EPC,
wherein the broken connection between the first BS and the EPC or the recovered connection between the first BS and the EPC is detected by the MME;
determining whether or not to perform a handover of a user equipment (UE) from the second BS to the first BS, based on the received information,
wherein the UE located in coverage of the second BS moves to coverage of the first BS, and
wherein the second BS is connected with the EPC; and
performing the handover of the UE from the second BS to the first BS, if the information on the recovered connection between the first BS and the EPC is received,
wherein the handover of the UE from the second BS to the first BS is not performed by the second BS until the connection between the first BS and the EPC is recovered, if the information on the broken connection between the first BS and the EPC is received.

2. The method of claim 1, further comprising:
determining whether or not to include the first BS in an isolated BS group, if the second BS is not connected with the EPC.

3. The method of claim 1, further comprising:
excluding the first BS from an isolated BS group, if the second BS is not connected with the EPC.

4. The method of claim 1, wherein there is no X2 connection between the first BS and the second BS.

5. The method of claim 1, wherein the received information is transmitted via an MME isolation indication message, an MME restoration indication message, or another message.

6. A second base station (BS) for identifying isolation or recovery of a first BS in a wireless communication system, the second BS comprising:
a memory;
a transceiver; and
a processor, connected with the memory and the transceiver, that:
controls the transceiver to receive, from a mobility management entity (MME), information on a broken connection between the first BS and an evolved packet core (EPC) or information on a recovered connection between the first BS and the EPC,
wherein the broken connection between the first BS and the EPC or the recovered connection between the first BS and the EPC is detected by the MME,
determines whether or not to perform a handover of a user equipment (UE) from the second BS to the first BS, based on the received information,
wherein the UE located in coverage of the second BS moves to coverage of the first BS, and
wherein the second BS is connected with the EPC, and
performs the handover of the UE from the second BS to the first BS, if the information on the recovered connection between the first BS and the EPC is received,
wherein the handover of the UE from the second BS to the first BS is not performed by the second BS until the connection between the first BS and the EPC is recovered, if the information on the broken connection between the first BS and the EPC is received.

7. The second BS of claim 6, wherein there is no X2 connection between the second BS and the first BS.

* * * * *